Patented Dec. 26, 1939

2,184,498

UNITED STATES PATENT OFFICE 2,184,498

MANUFACTURE OF STEEL OR ALLOY TUBES

Harry W. Hudson, Ellwood City, Pa., assignor to National Tube Company, a corporation of New Jersey No Drawing. Application November 17, 1937, Serial No. 175,136

3 Claims. (Cl. 148—12)

This invention relates to the manufacture of steel or alloy tubular articles, and more particularly to the manufacture of steel or alloy tubular articles having improved machining qualities.

Tubular articles are now applied as substitutes for solid bar stock for numerous uses, such as bearing races, chain links, roller cages and bushings, and such parts are usually machined on high speed automatic cutting machines. The parts thus manufactured from tubing must possess good machineability in order to maintain a uniform product and high production rates, and it is desirable in many instances that the machined article have a good surface finish.

Investigation of many different kinds of steel manufactured in the tubular goods field, and later machined on high speed automatic cutting equipment, has demonstrated that the different steels require special heat-treating and cold-drawing operations in order to develop the best cutting characteristics. Manufacturing practice employed in making a tube from one grade of steel is often entirely unsuitable for making the tube from some other type of steel. It has been found that by adding the improvement of air cooling low-carbon steels after heating the pierced blank to a temperature substantially above the upper critical point of the metal thereof prior to cold drawing, the machining qualities of the finished tube are highly improved both as regards tool life in high speed cutting operations, and also in the surface finish of the machined article.

It is accordingly an object of the present invention to provide an improved method of heat-treating cold drawn tubular articles during the process of production.

It is a further object of the invention to provide a process for producing tubular articles having improved machining properties.

Cold-drawn seamless tubing is ordinarily produced by piercing a billet while hot, hot-rolling the pierced shell over a plug and then cold-drawing it to size. Prior to cold-drawing, the shell is annealed and if more than one cold-draw pass is necessary to obtain the desired reduction, the shell is generally annealed between each cold-draw.

In accordance with the present invention, which is particularly applicable to the production of tubing having a wall thickness of from ⅛ to 1 inch from low-carbon steels, i. e., steels containing less than .25 per cent. carbon and alloy steels of the same carbon content, with alloying agents of which may vary over a wide range, a billet of such composition is pierced in accordance with conventional seamless practice. The pierced billet or shell is then heated to a temperature above the critical range, air-cooled in the atmosphere to approximately room temperature, and cold-drawn a predetermined amount to secure the best results.

In order to secure the best machining qualities, which has been found to depend on the structural condition of the steel or alloy, a definite structural state must be maintained. For low-carbon steel tubing containing less than .25 per cent. carbon, regardless of the alloy additions, it has been found that the best structural state for high speed cutting on certain low-carbon steels, especially those containing from 2 to 5 per cent. nickel, is that which is produced by heating the steel to a temperature substantially above the upper critical point, that is, between 1900 degrees and 2050 degrees Fahrenheit, holding it at this heat for a time period up to approximately one hour. The tubes are then withdrawn from the furnace at this temperature and cooled in air in order to develop a structure which is very definitely known in the art as the Widmanstatten structure. Usually, the higher the temperature reached, the better the structure obtained.

In low-carbon steels of the class described, heating to such high temperatures develops the austenitic grain structure, and the rapid cooling therefrom precipitates the carbides along the cleavage planes of the austenitic crystals when they transform at approximately 1650 degrees Fahrenheit. The distribution of the carbides along the cleavage planes is clearly indicated, and the coarse grain structure of the metal is also exhibited. It has been found that such a structure is free from soft ferrite zones which cause tough and difficult cutting; and the Widmanstatten structure produced by this heat-treatment enables very rapid machining.

After having been heat-treated in the manner described, the tube is ready for the finishing cold-draw pass. Cold-drawn tubes are in conventional practice cold-drawn to desired size, but in order to achieve the optimum results for machining, the reduction in area should be between 25 and 50 per cent. The effect of the cold-drawing within these limits is to elongate in the direction of the tube axis the definite constituents which comprise the steel structure. In cutting across these elongated constituents, there is a further tendency for breaking the chip, which further promotes improved cutting. The coldworking reduces the elongation and reduction of area of the steel, as measured in conventional testing, which also tends to increase the machineability of the steel so treated.

As a specific example, this method of producing tubing as applied to the following type of steel known as S. A. E. 2315, is given:

|  | Per cent |
|---|---|
| Carbon | .10– .20 |
| Manganese | .30– .60 |
| Nickel | 3.25–3.75 |
| Phosphorus  Maximum | .04 |
| Sulphur  do | .05 |
| Silicon | .15– .30 |

A billet of this analysis is pierced and rolled to produce a hot-forged section. The hot-forged tube is then heated to a temperature of 1900 degrees to 2050 degrees Fahrenheit for a period of approximately one hour, then withdrawn from the furnace at this temperature and cooled in air. The tube so treated is then pickled, lubricated and cold-drawn to obtain a 25 per cent. reduction in area. The tube so produced has highly improved cutting characteristics over tubing produced by any heretofore known method.

While I have described several embodiments of my invention, it will be understood that I do not wish to be limited exactly thereto since various modifications may be made within the scope of my invention, as defined by the appended claims.

I claim:

1. In the manufacture of cold-drawn nickel alloy steel tubing containing less than .25 per cent. carbon, from 2 to 5 per cent. nickel, from .30 per cent. to .60 per cent. manganese and the remainder iron to produce tubing having a high degree of machineability, the method comprising heating the tubular blank to a temperature substantially above the upper critical point, holding the blank at said temperature for approximately one hour, precipitating the carbides along the cleavage planes of the austenitic crystals by rapidly cooling the blank in the atmosphere, and finally elongating the constituents of the steel structure axially of the tubular blank by cold-drawing the same, thereby producing a tubular steel blank which is freely machineable.

2. In the manufacture of cold-drawn nickel alloy steel tubing containing less than .25 per cent. carbon, from 2 to 5 per cent. nickel, from .30 per cent. to .60 per cent., manganese and the remainder iron to produce a tubing having a high degree of machineability, the method comprising heating the tubular blank to a temperature between 1900 and 2050 degrees Fahrenheit, holding the blank at said temperature for approximately one hour, precipitating the carbides along the cleavage planes of the austenitic crystals by rapidly cooling the blank in the atmosphere to approximately room temperature, and finally elongating the constituents of the steel structure axially of the tubular blank by cold-drawing the same an amount sufficient to effect a reduction in area thereof of between 25 and 50 per cent., thereby producing a steel blank which is freely machineable.

3. In the manufacture of cold-drawn nickel alloy steel tubing having a wall thickness of from ⅛ inch to 1 inch and containing from .10 per cent. to .20 per cent. of carbon, from .30 per cent. to .60 per cent. of manganese, from 3.25 per cent. to 3.75 per cent of nickel, a maximum of .04 per cent. of phosphorus, a maximum of .05 per cent. of sulphur and from .15 per cent. to .30 per cent. of silicon to produce tubing having a high degree of machineability, the method comprising heating the tubing to a temperature between 1900 degrees and 2050 degrees Fahrenheit, holding the tubing at said temperature for approximately one hour, precipitating the carbides along the cleavage planes of the austenitic crystals by rapidly cooling the tubing in the atmosphere to approximately room temperature, and finally elongating the constituents of the nickel alloy structure axially of the tubing by cold-drawing the same an amount sufficient to effect a reduction in area of approximately 25 per cent., thereby producing tubing that is freely machineable.

HARRY W. HUDSON.